UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

BLUE TETRAZO DYE.

SPECIFICATION forming part of Letters Patent No. 516,758, dated March 20, 1894.

Application filed December 20, 1893. Serial No. 494,222. (Specimens.) Patented in France January 27, 1893, No. 227,474, and in England January 27, 1893, No. 9,183.

*To all whom it may concern:*

Be it known that I, JOHANN JAKOB BRACK, a citizen of the Swiss Republic, residing at Basle, Switzerland, have invented new and useful Improvements in the Production of Tetrazo Coloring-Matters, (partly patented in France by Letters Patent No. 227,474, dated January 27, 1893, and in England by Letters Patent No. 9,183, dated, under International Convention, January 27, 1893, date of application May 8, 1893;) and I hereby declare the following to be a full, clear, and exact description of the invention.

This invention relates to the manufacture of new polyazo-coloring matters, dyeing unmordanted cotton, in an alkaline bath, a violet tint, the said coloring matters being obtained by combining a naphtol sulfo acid with the tetrazo-derivative of the diamido-base resulting from the condensation of formaldehyde with tolidin and the hydrochlorate of an aromatic diamin.

By way of example, I will now describe the production of the violet coloring matters obtained with alpha-naphtol-alpha-monosulfo-acid and the diamido-bases derived from formaldehyde, tolidin and the hydrochlorate of tolidin or metaphenylenediamin.

I. *Production of the dye by combining alpha-naphtol-alpha-monosulfonic acid with the tetrazo-derivative of the diamido-base obtained from formaldehyde, tolidin and the hydrochlorate of tolidin.*—4.3 kilos of the diamido-base obtained by condensing equivalent quantities of formaldehyde, tolidin and tolidin-hydrochlorate are diazotized in the usual way by means of eight kilos of hydrochloric acid at 21° Baumé acid, and 1.4 kilos of sodium nitrite. The tetrazo-derivative thus obtained is poured into a solution containing 4.5 kilos of alpha-naphtol-alpha-sulfonic acid and six kilos of carbonate of soda. After leaving the mass to itself for some hours, it is heated to ebullition, and the coloring matter is precipitated by the addition of sea salt. When dried, this coloring matter is a dark brown powder with a metallic luster, which dyes unmordanted cotton in an alkaline bath to a violet tint. Its solution in concentrated sulfuric acid has a gray violet color. This coloring matter is readily soluble in water but is only slightly soluble in alcohol.

II. *Production of the dye by combining alpha-naphtol-alpha-monosulfonic-acid with the tetrazo-derivative of the diamido-base obtained from formaldehyde, tolidin and the hydrochlorate of metaphenylenediamin.*—If in the preceding example, the 4.3 kilos of the diamido-base obtained by condensing equivalent quantities of formaldehyde, tolidin and tolidin-hydrochlorate, be replaced by 3.3 kilos of the diamido-base derived from equivalent quantities of formaldehyde, tolidin and metaphenylenediamin chlorhydrate, there is formed a coloring matter which dyes unmordanted cotton to a blue violet color. The solution of the powder which has a metallic green luster, in concentrated sulfuric acid, is of a blue color. This coloring matter is readily soluble in water but is only slightly soluble in alcohol.

What I claim as my invention, and wish to secure by Letters Patent, is—

1. The herein described process for the manufacture of tetrazo-coloring matters, which consists in combining two molecules of alpha-naphtol alpha-sulfo-acid with one molecule of the tetrazo-derivative of the diamido-base resulting from the condensation of equivalent quantities of formaldehyde, tolidin and the hydrochlorate of an aromatic diamin, as set forth.

2. The herein described process for the manufacture of a tetrazo-coloring matter which consists in combining two molecules of alpha-naphtol alpha-monosulfo-acid with one molecule of the tetrazo-derivative of the diamido-base resulting from the condensation of equivalent quantities of formaldehyde, tolidin and the hydrochlorate of an aromatic diamin, as set forth.

3. The herein described tetrazo-coloring matter derived from alpha-naphtol-alpha-monosulfo-acid and the diamido-base obtained by the condensation of equivalent quantities of formaldehyde, tolidin and the hydrochlorate of metaphenylenediamin, the said coloring matter being in its dry state in the form of a brown powder with a metallic luster, which is soluble in water, dyes unmordanted cotton in an alkaline bath to a blue tint, dissolves in concentrated sulfuric acid with a blue coloration, dissolves readily in water and is sparingly soluble in alcohol, as set forth.

In witness whereof I have hereunto signed my name in the presence of two subscribing witnesses.

JOHANN JAKOB BRACK.

Witnesses:
   THEODORE STACHELIN,
   GEORGE GIFFORD.